2,278,730

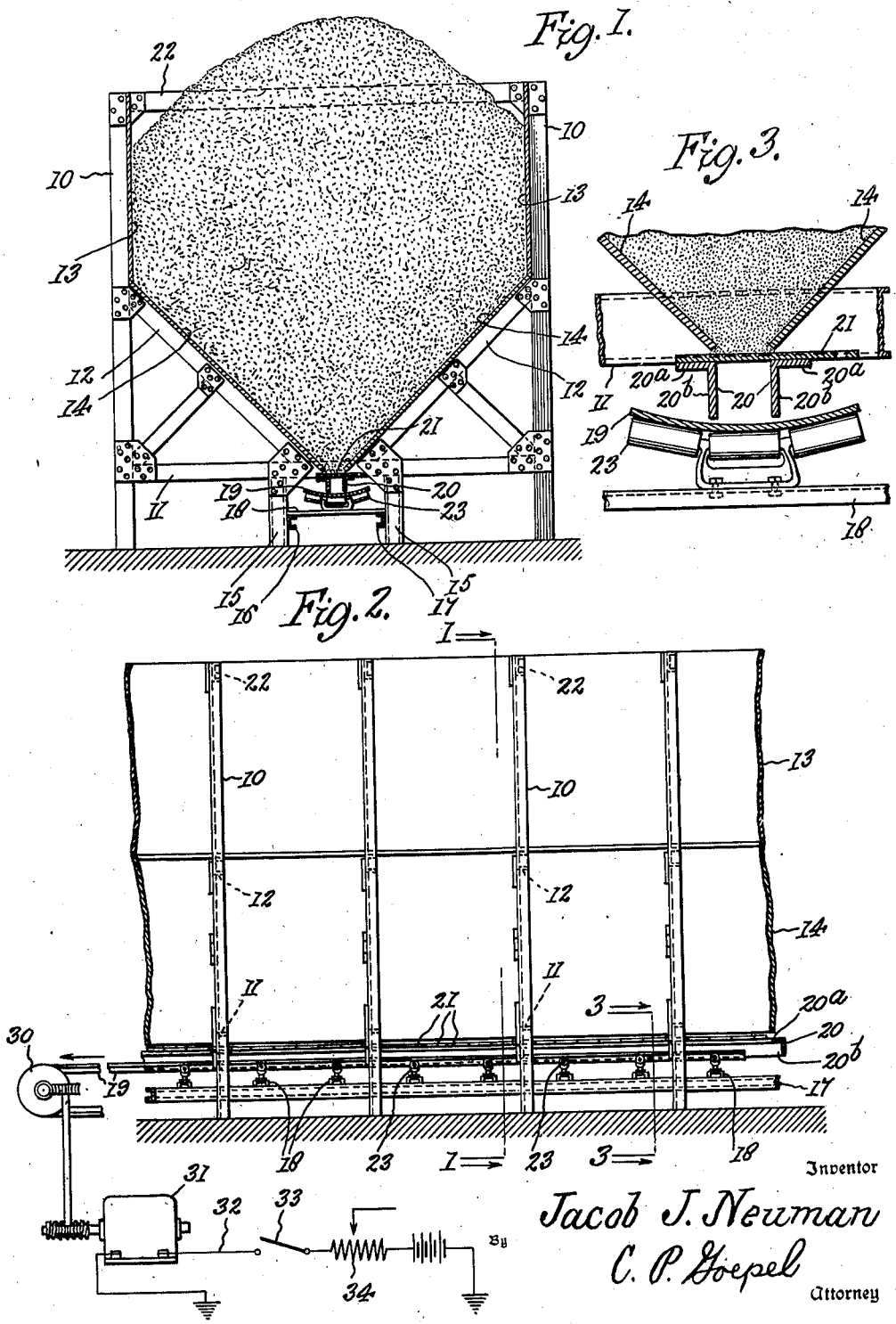
April 7, 1942. J. J. NEUMAN 2,278,730
APPARATUS FOR DISCHARGING BINS TO CONVEYERS
Filed Jan. 18, 1940
Inventor
Jacob J. Neuman
C. P. Goepel
Attorney Patented Apr. 7, 1942

UNITED STATES PATENT OFFICE 2,278,730

APPARATUS FOR DISCHARGING BINS TO CONVEYERS

Jacob J. Neuman, South Salem, N. Y., assignor to United States Patent Development and Royalty Company, South Salem, N. Y., a company of New York Application January 18, 1940, Serial No. 314,518

2 Claims. (Cl. 198—56)

This invention relates to apparatus for discharging bins to conveyers and more especially to means for automatically insuring the delivery of a constant amount of material of a granulated or comminuted material from such a bin to a belt conveyer disposed below said bin for the purpose of evenly loading said conveyer regardless of the speed thereof.

Considerable difficulty has been experienced in the past in discharging granulated materials such as sugar, grain, cement and materials of a like nature which are stored in bins, in such a manner that the delivery to the conveyer could be controlled without the use of complicated and costly devices. It is, therefore, the primary object of the present invention to provide a simple, effective and inexpensive means which may be easily applied to an existing installation as well as a new installation with a minimum number of changes to existing equipment.

Such bins are conventionally provided at the bottom with an opening of uniform width extending the length of the bin, under which a belt conveyer is positioned. When the bin is being filled, the opening is closed by a series of steel plates covering the said opening for its entire length. In conventional practice as the bin is being discharged the plates are removed one at a time, the material feeding down by gravity through the opening, and this is where the difficulty arises due to the tendency of the material to become more or less packed. It then becomes necessary to remove more plates in order to start the flow again.

Due to packing, the material above is constantly becoming undermined and then caving in and allowing a large quantity to suddenly discharge to the belt if the bin man is not constantly present to regulate the flow. Even where constant attention is maintained, it is practically impossible to keep an even flow to the conveyer. Furthermore, with this method, even if the material is not packed and flowing freely, it is impossible to maintain an even flow because when a plate is pulled out the support is thus removed from the material above for a space which is the full length of the plate but as the material feeds down this space is gradually reduced in area until it becomes necessary to remove another plate. The cross sectional area of the stream of material flowing to the conveyer is thus constantly increasing and decreasing. By the use of the present invention the quantity of material loaded on the conveyer is the same per unit length of conveyer belt regardless of the number of plates removed or the speed of the conveyer belt. With this condition prevailing, it is easily seen that the quantity of material removed may be very conveniently and accurately controlled by varying the speed of the conveyer. An added advantage is that this may be done from a remote electrical control station at the point where the material is finally being delivered.

With the above and other objects in view, the invention consists in the improved apparatus for discharging a bin and in the form, construction and relative arrangement of its several parts, as will be hereinafter more fully described, illustrated in the accompanying drawing and subsequently incorporated in the subjoined claims.

In the drawing, wherein I have illustrated one simple and practical embodiment of the present invention, and in which similar reference characters designate corresponding parts throughout the several views—

Figure 1 is a cross sectional view of a bin, with the invention applied thereto, taken on the line 1—1 of Figure 2.

Figure 2 is a fragmentary side elevation of a section of the bin and the apparatus for discharging same, and Figure 3 is an enlarged detail cross sectional view of the lower section of the bin taken on the line 3—3 of Figure 2 and showing the arrangement of the apparatus, conveyer, etc.

Referring to the drawing, I have shown a conventional type of bin used for storing granular materials consisting of a series of steel frames with the vertical side members 10, the horizontal cross members 11 and 22 and the inclined members 12 all suitably braced and serving to support the vertical side walls 13 and the inclined walls 14. The walls 14 are inclined at an angle somewhat greater than the angle of repose of the material, which is stored in the bin, for the purpose of insuring that all the material in said bin will feed out by gravity. Secured to the vertical members 15 are the horizontal members 16 and 17 which are in opposed relation and parallel to each other and which extend the entire length of the bin.

The members 16 and 17 form a support for the cross members 18 carrying the conveyer idlers 23 which, in the embodiment illustrated, are of the troughing type, but any type of idler may be used. The conveyer belt 19 rides upon and is supported by the idlers 23. Fastened to the underside of the cross members 11 are the angle members 20 which extend the length of the bin and have the short legs or webs 20a which are disposed horizontally and the longer legs or walls 20b which are disposed vertically, the two members 20 being positioned in opposed relation to each other. The legs or walls 20b extend vertically downward and have their lower edges in close proximity to the belt 19 but not contacting said belt 19. The horizontally disposed legs or webs 20a are used to fasten the members 20 to the members 11 and form a support for the series of plates or other valve means 21 which are inserted between the said legs 20a and the lower edges of the inclined walls 14.

The conveyer 19, as will be seen from Figure 3, is upcurved in transverse section and the lower ends of the confining or restricting walls 20b approach very closely to the lower intermediate portion of the conveyer. These walls 20b extend substantially from the discharge opening of the bin down to the intermediate part of the conveyer 19, whether such conveyer be of the form shown in Figure 3, whether it be a transversely straight conveyer or of other form or type; the walls 20b being spaced apart preferably substantially the port width of the discharge opening of the bin whereby to provide in this space a trough or channel which is longitudinally continuous substantially throughout the length of the bin in the direction of travel of the conveyer 19.

As shown in Figure 3 the webs 20a are shown as welded or otherwise secured to the lower edges of the traverse leveling beams 11.

Still viewing Figure 3, it will be noted that the transverse leveling beams 11 pass through the lower portion of the bin and the lower edges of these beams project down to a plane which is below the discharge opening of the bin. Consequently as conveyer 19 moves along, the column of material contained in the trough upon which devolves the superincumbent weight of the material in the bin will encounter the leveling beams 11 and as the trough material passes under the beam 11 it will be cut off from such superincumbent material in the bin; thus tending, at each passage of a transverse leveling beam for the material at the top of the trough to be leveled off by the lower edge of the beam and cut off from all overlying material so that the weight is taken off the same and every opportunity is given the material both in the trough and in the bin to rearrange itself and to rid itself of voids or massing and packing of the material to the end that a free volume of free flowing material will be contained to capacity in the trough and thus insure that a predetermined amount of material per unit of length of the conveyer be automatically contained in this trough or channel at all times. Thus the beams 11 not only serve to reinforce and strengthen the framework and the bin, and to serve as a point of attachment for the trough walls or their webs 20a, but such transverse walls also have an active function in leveling the material in the trough. The last beam 11 in the series will of course impress upon the material in the trough a final leveled condition.

In Figure 2 the endless conveyer is shown as moving in the direction of the arrow toward and over a sheave 30 which is located at destination of the material. The sheave is driven by an electric motor 31 in circuit 32 with a switch 33 and a rheostat or variable resistance 34 to control its speed and therefore to control the linear speed of the conveyer belt 19.

It is preferable to have the walls 20b of the trough or channel stationary as respects the conveyer 19, as in the case where these walls are carried by the transverse beams 11, for the reason that the material contained in the trough and moved along by the conveyer 19 will encounter the side walls 20b and tend to set up a frictional retarding movement which may with some materials result in a slight lag in the movement of the material with respect to the conveyer 19.

In any event whether there be lag or not the friction set up will tend to cause a rearrangement of the particles of the material within the trough such as to prevent the creation of any voids or air spaces in the material, necessitating the material completely filling the trough.

In operation, when it is desired to empty the bin the conveyer belt 19 is started and several of the plates 21 are removed usually from the end of the bin nearest to the discharge end of the conveyer belt 19, although this is not necessary and the bin may be discharged from the opposite end first or from any intermediate section thereof. The material now feeds down by gravity through the opening in the bottom of the bin thus created. Regardless of whether one of the plates 21 or several are removed the amount of material carried by the belt 19 cannot exceed the cross sectional limitation imposed by the rectangle formed between the legs 20b of the members 20, the cross members 11, and the conveyer belt 19 itself. It is advantageous to remove several of the plates 21 at the same time because then, if the material over one part of the opening in the bottom of the bin becomes temporarily jammed, the material will continue to feed through the rest of the opening and tend to clear the jammed section. Also if several plates are removed at once the attention of the operator will not be constantly required thus leaving him free to do other work.

Since the volume per foot on the conveyer belt 19 is thus fixed, it is then easily seen that the volume of the material conveyed thereby may be very quickly and accurately controlled by varying the speed of said conveyer belt 19 since: Volume per minute equals volume per foot times feet per minute.

From the foregoing description considered in connection with the accompanying drawing, it will be clearly understood that the above described invention provides a reliable and accurate method of control for the discharge from a bin which has a wide range of variation. Also, it will be appreciated that the result is accomplished with a combination of inexpensive and rugged equipment.

It is obvious that various changes and modifications may be made in the details of construction and the method of use of the above described embodiment of my invention without departing from the spirit thereof, such changes and modifications being restricted only by the scope of the following claims.

What is claimed is:

1. In a material feeding device, a material bin having outwardly convergent walls leading to a discharge opening which extends longitudinally throughout the length of the bin, a conveyer below said discharge opening positioned to receive material from said bin, leveling beams extending transversely above said conveyer and through the lower portion of said bin, and lower edges of said beams terminating immediately below said discharge opening, a pair of spaced vertical members secured to the underside of said leveling beams and extending longitudinally along the bottom of said bin on each side of said discharge opening, the lower edges of said members terminating adjacent said conveyer to form a trough extending longitudinally throughout the length of said discharge opening, transverse plates slidably supported on said members for selectively controlling the discharge of material from said bin into said trough and on to said conveyer, and means for selectively driving said conveyer at variable speeds.

2. In a material feeding device, a material bin having walls converging to a discharge opening in the bottom thereof which extends longitudinally throughout the length of the bin, said walls having an angle somewhat greater than the angle of repose of the material, a conveyer curved in transverse cross-section below said discharge opening positioned to receive the material from said bin, a pair of spaced vertical members on opposite sides of said discharge opening extending substantially from the bottom of the bin to the conveyer and spaced from each other a distance to form a trough to guide the material to the central part of the curved conveyer to confine the material substantially within the cross-sectional apex of said trough, said members extending longitudinally throughout the length of said discharge opening, transverse valve plates slidably mounted on said trough-forming members for selectively controlling the discharge of material from said bin into said trough and onto said conveyer, and spaced levelling beams transversely of the trough, and in the path of the superincumbent material in the trough as the conveyer passes beneath the said levelling beams, the lower edges of said levelling beams terminating immediately below the discharge opening.

JACOB J. NEUMAN.